Jan. 5, 1937.  J. R. THORP ET AL  2,066,590
VEHICLE VENTILATING WING
Filed April 27, 1936
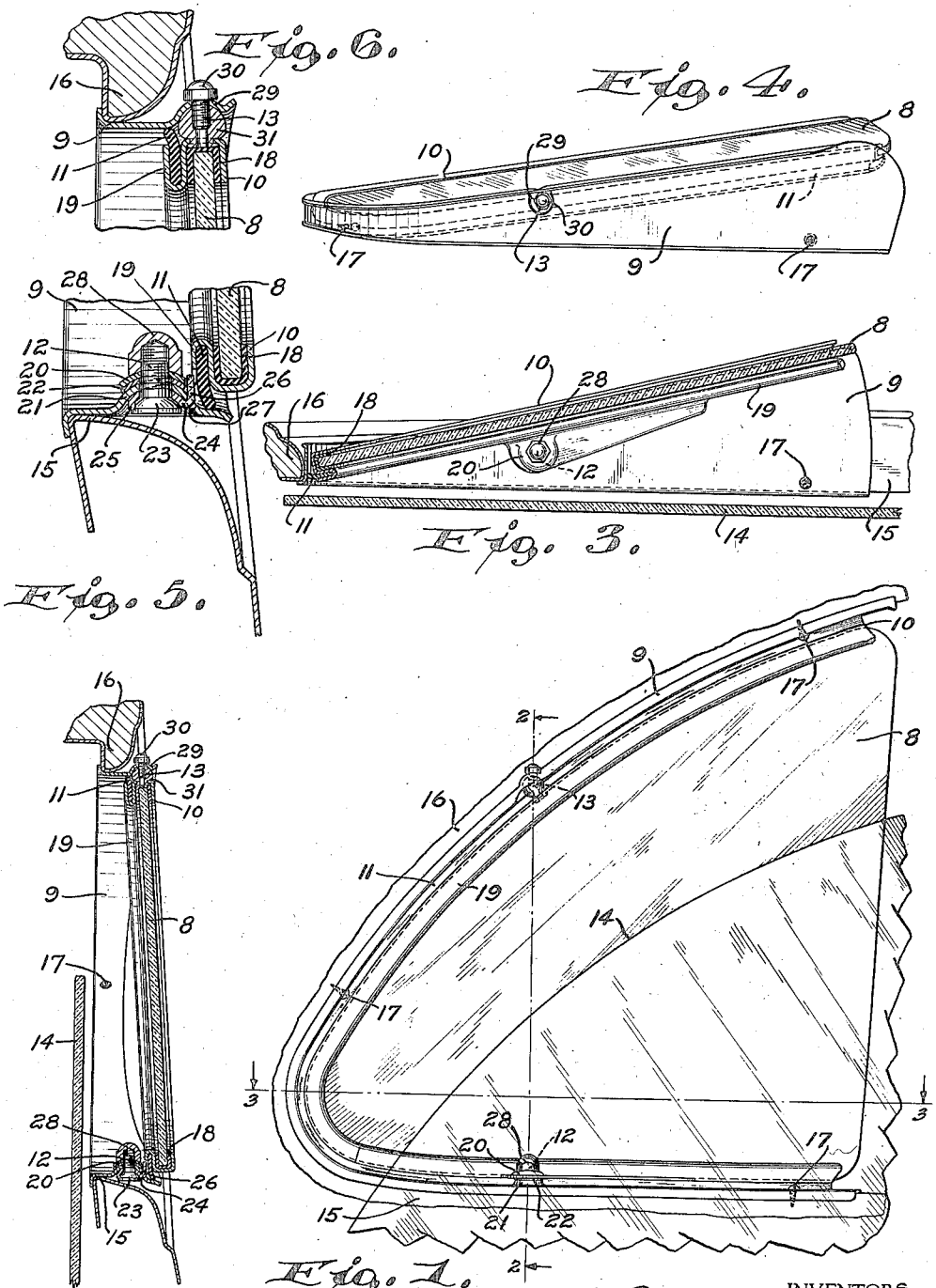
INVENTORS.
J. R. Thorp
BY W. H. Lieber
Morsell, Lieber & Morsell
ATTORNEYS.

UNITED STATES PATENT OFFICE 2,066,590

VEHICLE VENTILATING WING

Joel R. Thorp, West Allis, and William H. Lieber, Wauwatosa, Wis., assignors to The Fulton Company, West Allis, Wis., a corporation of Wisconsin Application April 27, 1936, Serial No. 76,496

7 Claims. (Cl. 296—84)

Our present invention relates generally to improvements in the construction of ventilating devices for vehicle enclosures, and relates more specifically to an improved side wing assemblage which is adapted for application as a unit to the door window reveals of automobiles or the like.

An object of the present invention is to provide a ventilating wing assemblage which may be applied to or removed from the window reveals as a unit, and which affords an effective seal against entry of draft, rain, dust or the like, for various adjustments of the wing.

Many different types of pivotally adjustable deflector shields or wings have heretofore been used in connection with the side door windows of vehicular enclosures. Some of these deflector wings are built into the door structure by the vehicle manufacturers, while others are sold as accessories for application to various styles of windows. The assemblages heretofore furnished as accessories are decidedly objectionable for several reasons, and especially because they are not adapted to be handled as complete units during installation or removal, and also because they do not provide an effective seal against the weather, for various positions of adjustment while permitting displacement of the wings to any desired angular position. The prior side wing assemblages moreover cannot be quickly and conveniently applied and attached to the vehicle windows, and necessitate the use of several supporting brackets and numerous fasteners which make it difficult to properly aline the pivot bearings so as to insure most efficient and convenient manipulation of the deflectors. Aside from these objections, the prior ventilating accessories are relatively complicated and subject to looseness and consequent rattling of parts, and do not present as neat and highly finished an appearance as is desirable. The odd shapes assumed by the door window reveals of the more modern streamlined automobiles, has also made it difficult to provide attaching brackets of the prior types, which will effectively retain the pivot bearings in place, thus obviously making the previous devices of this kind extremely objectionable and relatively inefficient.

It is therefore a more specific object of the present invention to provide an improved deflector wing unit which is adapted to be readily applied as an accessory to window reveals of relatively odd shapes, and which eliminates the objectionable features of prior accessories of this general type.

Another specific object of the present invention is the provision of a side wing assemblage having a single supporting bracket for the upper and lower pivot bearings, and provided with a single continuous flexible seal carried by the wing and cooperable with the support to provide a tight joint for various positions of angular adjustment of the deflector shield.

A further object of our present invention is to provide a new and useful ventilating structure which is especially adapted for attachment to a substantially triangular window reveal such as the side door window reveal of a streamlined automobile, and which is extremely simple in construction and efficient in use.

Still another object of the invention is to provide an improved pivotal mounting for a substantially triangular ventilating wing, which while affording an efficient seal against the weather, will nevertheless permit swinging of the front and rear portions of the wing through the window opening without obstruction.

An additional specific object of the present invention is the provision of a simple, compact and durable ventilating unit, which can be quickly installed or removed without undesirably marring the window reveal, and which presents a highly attractive and finished appearance.

These and other objects of the invention will be apparent from the following detailed description.

A clear conception of the specific nature of the present improvement, and of the mode of constructing, applying and of utilizing improved ventilating wing units built in accordance with the invention, may be had by referring to the drawing accompanying and forming a part of this specification wherein like reference characters designate the same or similar parts in the various views.

Fig. 1 is an inside elevation of a fragment of a side door window reveal of a streamlined automobile, having one of the present improved wing assemblages applied thereto, and showing the adjacent main window glass partially lowered;

Fig. 2 is a vertical section through the main window and wing assemblage of Fig. 1, the section being taken along the line 2—2;

Fig. 3 is a transverse horizontal section through the main window and wing assemblage of Fig. 1, taken along the line 3—3 and showing the wing swung inwardly at its forward end to a somewhat greater extent than in Fig. 2;

Fig. 4 is a top view of the wing assemblage removed from the window reveal;

Fig. 5 is an enlarged vertical section through the lower window reveal, the lower portion of the wing supporting bracket, and a fragment of the wing; and Fig. 6 is a similarly enlarged vertical section through the upper front portion of the window reveal, the upper portion of the wing supporting bracket, and a fragment of the wing.

While the invention is shown herein as being specifically applied to a side wing especially adapted for application to and cooperation with the side window of a streamlined automobile, it is not the intent to thereby unnecessarily restrict the scope, since some of the features may obviously be advantageously applied to ventilating devices for other classes of vehicles such as launches and airplanes.

Referring to the drawing, the improved side wing assemblage specifically shown by way of illustration, comprises in general, a transparent wing or deflector shield 8 of substantially triangular shape ordinarily formed of glass; a one-piece relatively resilient supporting bracket 9 normally extending along but spaced from the upper forward and lower edges of the shield 8; a reenforcing and nosing strip 10 attached to the upper forward and lower edges of the shield 8 in proximity to the bracket 9; a continuous flexible seal 11 carried by the nosing strip 10 adjacent to the inner surface of the shield 8 and adapted to snugly engage the adjacent surface of the bracket 9; and lower and upper pivots 12, 13 respectively connecting the lower and upper portions of the bracket 9 with the adjacent portions of the strip 10 so as to permit angular displacement of the shield 8 about a substantially upright axis.

The improved ventilating unit by virtue of the flexibility or resiliency of the one-piece bracket 9, is readily attachable to a main window assemblage having a vertically slidable window 14 and an opening bounded by relatively inclined lower and upper reveal portions 15, 16 respectively. The bracket 9 which is formed of relatively thin sheet metal or the like, is shaped to initially approximately fit the reveal portions 15, 16 of standard automobile side doors, and may be distorted to accurately fit and be snugly attached to these reveal portions with the aid of two or more small screws 17 applied as shown in the drawing. The rear ends of the bracket 9 are of considerably greater transverse width than the front portion thereof, and the bracket 9 is provided with a continuous U-shaped inner surface disposed closely adjacent to the top, front and lower edge portions of the shield 8, the pivots 12, 13 being so disposed that the shield 8 may be swung through a considerable angle without causing the flexible seal 11 to actually break contact with this continuous U-shaped surface of the bracket 9. When such contact is maintained, the window 14 may be lowered to a considerable extent without permitting draft, rain, dust or the like to enter the vehicle enclosure when the vehicle is traveling forward; but the shield 8 may, if desired, be swung to abruptly angular positions, with either its front or rear end extending far into the car enclosure through the window opening when the main window 14 has been lowered sufficiently. The seal 11 will then act as a buffer to protect the adjacent upper edge of the window 14 in case the latter is accidentally raised while the shield 8 is swung over its path of sliding.

The reenforcing and nosing strip 10 may be formed of one or more channel or U-shaped metal bars and the edge of the shield 8 is snugly confined by and seated within a rubber retainer 18 mounted in the outer recess of this strip 10. The strip 10 is also provided with a reversely bent flange 19 forming a continuous inner recess within which the flexible seal 11 is clamped and confined, and the seal 11 may be formed of soft rubber and should be so constructed that it will maintain effective sealing contact with the bracket 9 while avoiding excessive frictional resistance. The lower portion of the channel strip 10 is also provided with an integral bearing ear 20 projecting inwardly from the flange 19 and having an upwardly concave socket and a central opening through which the lower pivot 12 extends as shown in Fig. 5. The adjacent lower portion of the one-piece bracket 9 has an upwardly extending integral semi-spherical projection 21 extending into the concavity of the ear 20 and also pierced by the lower pivot 12. A dished friction washer 22 is disposed between the spherical zone surfaces of the ear 20 and projection 21, and the pivot 12 penetrates these elements and has a lower head 23 notched on one side and coacting with a dished pivot retainer 24 located within the concavity of the projection 21. The pivot retainer 24 is also formed of sheet metal and has a lug 25 at one side thereof which engages the notch in the head 23 to prevent rotation of the pivot 12, and also has an upright projection 26 at the opposite side thereof passing through an elongated slot 27 in the bracket 9 and into a hole in the ear 20 so as to prevent rotation of the retainer 21 relative to the shield 8. A clamping nut 28 coacts with the upper threaded end of the lower pivot 12 and rotates with the pivot 12, the ear 20, and the retainer 24 when the shield 8 is angularly displaced. The lower pivot 12 is offset with respect to the plane of the shield 8 and is located approximately midway between this plane and the plane of the outer face of the window 14. The upper pivot 13 is disposed substantially in the plane of the shield 8, and penetrates an upwardly extending semi-spherical projection 29 formed integral with the adjacent portion of the one-piece bracket 9 as shown in Fig. 6. The head 30 of the pivot 13 is located above the projection 29, and the threaded shank of this pivot penetrates a central opening in the projection 29 and coacts with a ball member 31 which is rigidly attached to the upper inclined portion of the channel strip 10. The ball member 31 coacts snugly with the lower concavity in the bracket projection 29 thereby providing a simple and durable upper pivot assemblage. The pivots 12, 13 are preferably offset slightly so as to bring their axes into substantial alinement with each other, and require no adjustment after they have once been properly applied to the bracket 9.

The improved ventilating unit may obviously be readily assembled and subsequently handled as a single unitary assemblage. After the bracket 9 has been formed and finished, and the strip 10 and seal 11 together with the ball member 31 have been attached to the transparent shield 8, the shield assemblage may be disposed within the bracket and pivotally attached thereto in the manner described. The shield 8 may then be swung to various positions of angular adjustment about the axis of the pivots 12, 13, and the nut 28 which rotates with the pivot 12 and retainer 21 during swinging of the shield 8, may be adjusted to produce sufficient frictional resistance so that the shield will remain in various positions of angular adjustment. The continuous seal 11 will engage the adjacent surface of the bracket 9 to provide a tight joint, and the slot 27 in the bracket 9 is of sufficient length to permit free rotation of the retainer 24 with the shield 8 throughout the desired range of angular adjustment of the deflector wing. The assembled unit may be brought into snug coaction with the window reveals 15, 16 by merely pushing the flexible bracket forwardly within the main window opening until perfect contact between the bracket 9 and reveals 15, 16 is secured, whereupon the screws 17 may be applied to effect permanent and final attachment. During this attachment, the pivots 12, 13 will not be disturbed and will ordinarily require no readjustment and these pivots as well as the seal 11 will function precisely the same after final application, to the reveals, as they did in the initially assembled unit.

From the foregoing description it will be apparent that the present invention provides an improved ventilating wing assemblage for vehicles which is simple, compact and durable in construction, and which is adapted to maintain an effective seal against the weather. The seal 11 serves as a weather strip coacting with the widened upper and lower portions of the bracket 9 to permit considerable angular adjustment of the shield 8 without producing direct openings to the outside; and the one-piece formation of the bracket 9 insures effective sealing along the entire top, front and bottom edges of the shield 8. The substantially triangular formation of the shield 8 and the corresponding angular shape of the bracket 9, make the ventilating unit especially applicable to odd shaped reveals such as are utilized on streamlined vehicles, and the improved wing assemblages present a neat and finished appearance and can be manufactured and sold at moderate cost. These units can moreover be quickly attached to or removed from the reveals 15, 16 without necessity of using special tools, and are not subject to rattling due to looseness of parts. It is also to be noted that by locating the upper pivot 13 substantially in the plane of the shield 8, and the lower pivot 12 between the shield 8 and window 14, the shield 8 will have a natural inclination toward the vehicle enclosure and will lie substantially flush with the outer surface of this enclosure when the wing is in neutral position.

It should be understood that it is not our desire to limit the invention to the exact details of construction and to the precise mode of operation herein shown and described, for various modifications within the scope of the appended claims may occur to persons skilled in the art.

We claim:—

1. A ventilating wing assemblage, comprising, a one-piece sheet metal bracket having integrally united relatively inclined upper, forward and lower portions, a deflector shield of substantially triangular shape having a nosing strip extending along its forward relatively inclined edges, a flexible seal carried by said nosing strip and engageable with both of said bracket portions, and pivots connecting said bracket and said nosing strip.

2. A ventilating wing assemblage, comprising, a one-piece sheet metal bracket having integrally united relatively inclined upper, forward and lower portions, a deflector shield of substantially triangular shape having a nosing strip extending along its forward relatively inclined edges, a flexible seal carried by said nosing strip and engageable with both of said bracket portions, and substantially alined upper and lower pivots connecting said bracket portions with the adjacent portions of said nosing strip.

3. A ventilating wing assemblage, comprising, a unitary resilient bracket having integrally connected relatively inclined upper and lower portions, a deflector shield having an edging strip extending along and in close proximity to said bracket, a continuous flexible seal interposed between said edging strip and said bracket portions, and upper and lower substantially alined pivots connecting said bracket portions and the adjacent portions of said edging strip.

4. A ventilating wing assemblage, comprising, a unitary resilient bracket having integrally connected relatively inclined upper and lower portions, a deflector shield having an edging strip extending along and in close proximity to said bracket, a continuous flexible seal interposed between said edging strip and said bracket portions, and upper and lower substantially alined pivots connecting said bracket portions and the adjacent portions of said edging strip, said upper pivot lying in the plane of said shield and said lower pivot being disposed laterally of said plane.

5. A ventilating wing assemblage, comprising, a one-piece resilient bracket having relatively inclined upper and lower portions attachable to a window reveal, a substantially triangular deflector shield having a nosing strip extending along the forward edges thereof in close proximity to said bracket portions, alined upper and lower pivots connecting said bracket portions with said nosing strip, and a continuous flexible seal carried by said nosing strip and slidably engaging a surface of said bracket.

6. A ventilating wing assemblage, comprising a one-piece sheet metal frame having integrally united relatively inclined upper, forward and lower portions, a deflector shield of substantially triangular shape having a nosing strip extending along its forward relatively inclined edges, a flexible seal carried by said nosing strip and engageable with both of said frame portions, and pivots connecting said frame and said nosing strip, said shield being angularly adjustable about said pivots and said seal coacting with said frame portions to provide a sealed joint for various positions of adjustment of said shield.

7. A ventilating wing assemblage, comprising a one-piece sheet metal frame having integrally united relatively inclined upper, forward and lower portions, a deflector shield of substantially triangular shape having a nosing strip extending along its forward relatively inclined edges, a flexible seal carried by said nosing strip and engageable with both of said frame portions, and substantially alined upper and lower pivots connecting said frame portions with the adjacent portions of said nosing strip, said shield being angularly adjustable about said alined pivots and said seal being slidable in contact with said frame portions to provide a sealed joint for various positions of adjustment of said shield.

JOEL R. THORP.
WILLIAM H. LIEBER.